(12) United States Patent
Saika

(10) Patent No.: US 7,428,210 B2
(45) Date of Patent: Sep. 23, 2008

(54) FAIL OVER METHOD AND A COMPUTING SYSTEM HAVING FAIL OVER FUNCTION

(75) Inventor: Nobuyuki Saika, Yokosuka (JP)

(73) Assignee: Hitachi, Ltd., Tokyo (JP)

( * ) Notice: Subject to any disclaimer, the term of this patent is extended or adjusted under 35 U.S.C. 154(b) by 655 days.

(21) Appl. No.: 10/985,937

(22) Filed: Nov. 12, 2004

(65) Prior Publication Data

US 2006/0050629 A1      Mar. 9, 2006

(30) Foreign Application Priority Data

Sep. 7, 2004    (JP)    ............... 2004-259403

(51) Int. Cl.
G01R 31/08   (2006.01)

(52) U.S. Cl. .................. 370/217; 709/201; 712/28
(58) Field of Classification Search ............. 370/217; 709/207; 712/28

See application file for complete search history.

(56) References Cited

U.S. PATENT DOCUMENTS 6,128,279 A * 10/2000 O'Neill et al. ............. 370/229
6,154,765 A * 11/2000 Hart ........................... 709/201
6,965,936 B1 * 11/2005 Wipfel et al. ............... 709/224
2005/0138517 A1 * 6/2005 Monitizer ................... 714/746

FOREIGN PATENT DOCUMENTS

JP    2003-256399    9/2003

* cited by examiner

*Primary Examiner*—Firmin Backer
*Assistant Examiner*—Jason Mattis
(74) *Attorney, Agent, or Firm*—Antonelli, Terry, Stout & Kraus, LLP.

(57) ABSTRACT

Loads on a plurality of computers are made uniform after a fail over, and resource competition is prevented. Loads of nodes (1 to 4) in a cluster (100) are obtained, taking-over information when a trouble occurs in one of the plurality of nodes (1 to 4) is generated beforehand based on the obtained loads, and the taking-over information is stored in a shared storage system (6) shared by the plurality of nodes. The plurality of nodes (1 to 4) monitor operation states of one another. When an occurrence of a trouble is detected, each of the nodes (1 to 4) in the cluster (100) excluding the troubled node reads the taking-over information from the shared storage system (6), and takes over a processing of the troubled node based on a trouble pattern and the taking-over information.

14 Claims, 20 Drawing Sheets

FILE SYSTEM USER NUMBER LIST

| NODE NUMBER | 1 | | 2 | | 3 | | 4 | |
|---|---|---|---|---|---|---|---|---|
| | FILE SYSTEM NAME | NUMBER OF USERS | FILE SYSTEM NAME | NUMBER OF USERS | FILE SYSTEM NAME | NUMBER OF USERS | FILE SYSTEM NAME | NUMBER OF USERS |
| | fs11 | 100 | fs21 | 90 | fs31 | 90 | fs41 | 30 |
| | fs12 | 80 | fs22 | 60 | fs32 | 70 | fs42 | 30 |
| | fs13 | 60 | fs23 | 45 | fs33 | 40 | fs43 | 30 |
| | fs14 | 30 | fs24 | 45 | fs34 | 30 | fs44 | 20 |
| | fs15 | 20 | fs25 | 30 | fs35 | 10 | fs45 | 5 |
| | fs16 | 10 | fs26 | 20 | fs36 | 5 | fs27 | 10 |
| | | | fs28 | 5 | fs37 | 3 | | |

FIG. 5

TAKING-OVER NUMBER LIST

| NODE NUMBER | 1 | | 2 | | 3 | | 4 | |
|---|---|---|---|---|---|---|---|---|
| | FILE SYSTEM NAME | NUMBER OF TAKING-OVER TIMES IN FO | FILE SYSTEM NAME | NUMBER OF TAKING-OVER TIMES IN FO | FILE SYSTEM NAME | NUMBER OF TAKING-OVER TIMES IN FO | FILE SYSTEM NAME | NUMBER OF TAKING-OVER TIMES IN FO |
| | fs11 | 3 | fs21 | 3 | fs31 | 3 | fs41 | 3 |
| | fs12 | 3 | fs22 | 2 | fs32 | 2 | fs42 | 1 |
| | fs13 | 2 | fs23 | 1 | fs33 | 1 | fs43 | 0 |
| | fs14 | 0 | fs24 | 0 | fs34 | 0 | fs44 | 0 |
| | fs15 | 0 | fs25 | 0 | fs35 | 0 | fs45 | 0 |
| | fs16 | 0 | fs26 | 0 | fs36 | 0 | fs27 | 0 |
| | | | fs28 | | fs37 | 0 | | |

FIG. 6

| NODE NUMBER | MAXIMUM NUMBER OF USERS |
|---|---|
| 1 | 400 |
| 2 | 400 |
| 3 | 350 |
| 4 | 400 |

| STATE | 0TH stage | | 1ST STAGE | | 2ND STAGE | | 3RD STAGE | | 4TH STAGE | |
|---|---|---|---|---|---|---|---|---|---|---|
| | STATE NAME | BIT STRING | STATE NAME | BIT STRING | STATE NAME | BIT STRING | STATE NAME | BIT STRING | STATE NAME | BIT STRING |
| | St0 | (0, 0, 0, 0) | St8 | (1, 0, 0, 0) | St9 | (1, 0, 0, 1) | St14 | (1, 1, 1, 0) | St15 | (1, 1, 1, 1) |
| | | | St4 | (0, 1, 0, 0) | St10 | (1, 0, 1, 0) | St13 | (1, 1, 0, 1) | | |
| | | | St2 | (0, 0, 1, 0) | St12 | (1, 1, 0, 0) | St11 | (1, 0, 1, 1) | | |
| | | | St1 | (0, 0, 0, 1) | St5 | (0, 1, 0, 1) | St7 | (0, 1, 1, 1) | | |
| | | | | | St6 | (0, 1, 1, 0) | | | | |
| | | | | | St3 | (0, 0, 1, 1) | | | | |

| NODE NUMBER | 1 | | 2 | | 3 | | 4 | |
|---|---|---|---|---|---|---|---|---|
| | F/S NAME | NUMBER OF TAKING-OVER TIMES | F/S NAME | NUMBER OF TAKING-OVER TIMES | F/S NAME | NUMBER OF TAKING-OVER TIMES | F/S NAME | NUMBER OF TAKING-OVER TIMES |
| | fs11 | 2 | fs21 | 2 | fs31 | 2 | fs41 | 2 |
| | fs12 | 2 | fs22 | 1 | fs32 | 1 | fs42 | 0 |
| | fs13 | 1 | fs23 | 0 | fs33 | 0 | | |
| | | | fs24 | 0 | | | | |

ALLOCATED TO NODES 2, 3, AND 4

FIG. 9

```
                        NUMBER OF USERS
                        AFTER ALLOCATION
         NUMBER OF
 F/S      USERS      NODE                    MAXIMUM NUMBER
 NAME                NUMBER                    OF USERS fs11/100  ─────────▶ Node 4   225/400
  fs12/80   ─────────▶ Node 2   195/350
  fs13/60   ─────────▶ Node 3   308/400
```

*FIG. 10*

RESOURCE TAKING-OVER
LIST

| STATE NAME | NODE NUMBER | FILE SYSTEM NAME |
|---|---|---|
| St0 | 1 | fs11, fs12, fs13, fs14, fs15, fs16 |
|  | 2 | fs21, fs22, fs23, fs24, fs25, fs26, fs28 |
|  | 3 | fs31, fs32, fs33, fs34, fs35, fs36, fs37 |
|  | 4 | fs41, fs42, fs43, fs44, fs45, fs27 |
| St1 | 1 | fs11, fs12, fs13, fs14, fs15, fs16, ⋯ |
|  | 2 | fs21, fs22, fs23, fs24, fs25, fs26, fs28, ⋯ |
|  | 3 | fs31, fs32, fs33, fs34, fs35, fs36, fs37, ⋯ |
| ⋮ | ⋮ |  |
| St8 | 2 | fs21, fs22, fs23, fs24, fs25, fs26, fs28, fs12 |
|  | 3 | fs31, fs32, fs33, fs34, fs35, fs36, fs37, fs13 |
|  | 4 | fs41, fs42, fs43, fs44, fs45, fs27, fs11 |
| ⋮ | ⋮ |  |
| St14 | 4 | fs41, fs42, fs43, fs44, fs45, fs27, fs11⋯ |

*FIG. 11*

NODE-LIST-ALIVE

| NODE NAME |
|---|
| 1 |
| 3 |

*FIG. 12*

NODE-LIST-DOWN

| NODE NAME |
|---|
| 2 |
| 4 |

*FIG. 13*

ADDRESS TAKING-OVER
LIST

| STATE NAME | NODE NUMBER | ADDRESS |
|---|---|---|
| St0 | 1 | NODE1 |
| | 2 | NODE2 |
| | 3 | NODE3 |
| | 4 | NODE4 |
| St1 | 1 | NODE1, NODE4 |
| | 2 | NODE2 |
| | 3 | NODE3 |
| ⋮ | ⋮ | |
| St5 | 1 | NODE1, NODE2 |
| | 3 | NODE3, NODE4 |
| ⋮ | ⋮ | |
| St14 | 4 | NODE4, 3, 2, 1 |

*FIG. 14*

| NODE NUMBER | STATE | TIME STAMP |
|---|---|---|
| 1 | DOWN | 2004:06:28:14:00:00 |
| 2 | OPERATION | 2004:06:28:14:20:00 |
| 3 | OPERATION | 2004:06:28:14:20:00 |
| 4 | OPERATION | 2004:06:28:14:20:00 |

*FIG. 15*

| NODE NUMBER | NUMBER OF TIMES NODE IS SET AS MASTER |
|---|---|
| 1 | 15 |
| 2 | 15 |
| 3 | 14 |
| 4 | 14 |

*FIG. 24*

FAIL OVER METHOD AND A COMPUTING SYSTEM HAVING FAIL OVER FUNCTION

CLAIM OF PRIORITY

The present application claims priority from Japanese application P2004-259403 filed on Sep. 4, 2004, the content of which is hereby incorporated by reference into this application.

BACKGROUND

This invention relates to a technology of taking over processing of a node in which a trouble has occurred in a computing system comprising a plurality of nodes.

There has been known a cluster technology of causing a plurality of computers (nodes) to logically function as one computer. For example, a cluster server that causes a plurality of servers to function as one server is known.

Regarding the cluster server, there has been known a server (e.g., JP 2003-256399 A) which carries out, when a trouble occurs in one computer, a fail over process to cause the other computer to take over processing of the troubled computer and to continue services. According to this technology, when an own load increases after taking-over of the processing by the fail over, the other computer is requested to execute the processing.

SUMMARY

However, according to the conventional technology, the computer (node) that has taken over the processing by the fail over does not request the other computer (node) to continue the processing until its own load becomes high. Consequently, there is a problem in that the other computer having extra processing power cannot be used, and an uneven load state continues.

In the conventional example, while the processing is taken over at multiple stages, there is no idea of how to take over one resource when the processing is taken over at the plurality of nodes. Consequently, when a trouble occurs at one node and a multistage fail over is carried out to take over the processing at the plurality of nodes, there is a possibility that trying to take over one resource at the plurality of nodes will cause resource competition.

This invention has been made to solve the foregoing problems. An object of this invention is to make uniform loads on a plurality of computers after a fail over, and another object of this invention is to prevent resource competition.

In order to achieve the object, this invention provides a fail over method which is used for a system including a cluster constituted of a plurality of nodes and in which, when a trouble occurs in one of the plurality of nodes, another node takes over a processing of the troubled node. Taking-over information that the other node takes over the processing of the troubled node when the trouble occurs in one of the plurality of nodes is prestored in a storage system shared by the plurality of nodes. The plurality of nodes monitor operation states one another. When the occurrence of the trouble is detected, each node of the cluster excluding the troubled node reads the taking-over information from the shared storage system, and takes over the processing of the troubled node based on a pattern of the trouble and the taking-over information.

Thus, according to this invention, by dividing a taking-over target at the time of the fail over, and executing the fail over in a dispersed manner for the plurality of nodes, it is possible to suppress uneven loads among the plurality of nodes after the fail over.

Additionally, in the case of a multistage fail over, it is possible to suppress a load increase by narrowing down resources to be taken over.

Furthermore, since no resource competition in which the plurality of nodes take over one resource occurs in the taking-over processing by the fail over, and fail over operations or fail back operations can be executed in parallel, it is possible to accurately carry out taking-over or recovery at a high speed.

BRIEF DESCRIPTION OF THE DRAWINGS

FIG. 5 is an explanatory diagram of a file system user number list for each node which is created by the system management server according to the embodiment of this invention.

FIG. 6 is an explanatory diagram of a list of taking-over number of times for each node which is created by the system management server according to the embodiment of this invention.

FIG. 7 is an explanatory diagram of a maximum user number list for each node which is created by the system management server according to the embodiment of this invention.

FIG. 8 is an explanatory diagram of a cluster state list showing a cluster state according to a state name and a value of a bit string according to the embodiment of this invention.

FIG. 9 is an explanatory diagram of a list of taking-over number of times for each node at the time of a fail over according to the embodiment of this invention.

FIG. 10 is an explanatory diagram showing a resource taking-over situation for each node at the time of the fail over according to the embodiment of this invention.

FIG. 11 is an explanatory diagram of a resource taking-over list of states created by the system management server according to the embodiment of this invention.

FIG. 12 is an explanatory diagram of node_list_alive created by the system management server to indicate an operating node according to the embodiment of this invention.

FIG. 13 is an explanatory diagram of node_list_down created by the system management server to indicate a stopped node according to the embodiment of this invention.

FIG. 14 is an explanatory diagram of an address taking-over list of states created by the system management server according to the embodiment of this invention.

FIG. 15 is an explanatory diagram of a verification table shared by the nodes on a shared storage system according to the embodiment of this invention.

FIG. 24 is an explanatory diagram of a second modified example showing a table of a number of master times arranged on a shared storage system according to the embodiment of this invention.

DETAILED DESCRIPTION OF THE PREFERRED EMBODIMENTS

Next, an embodiment of this invention will be described with reference to the accompanying drawings.

Figure 1:
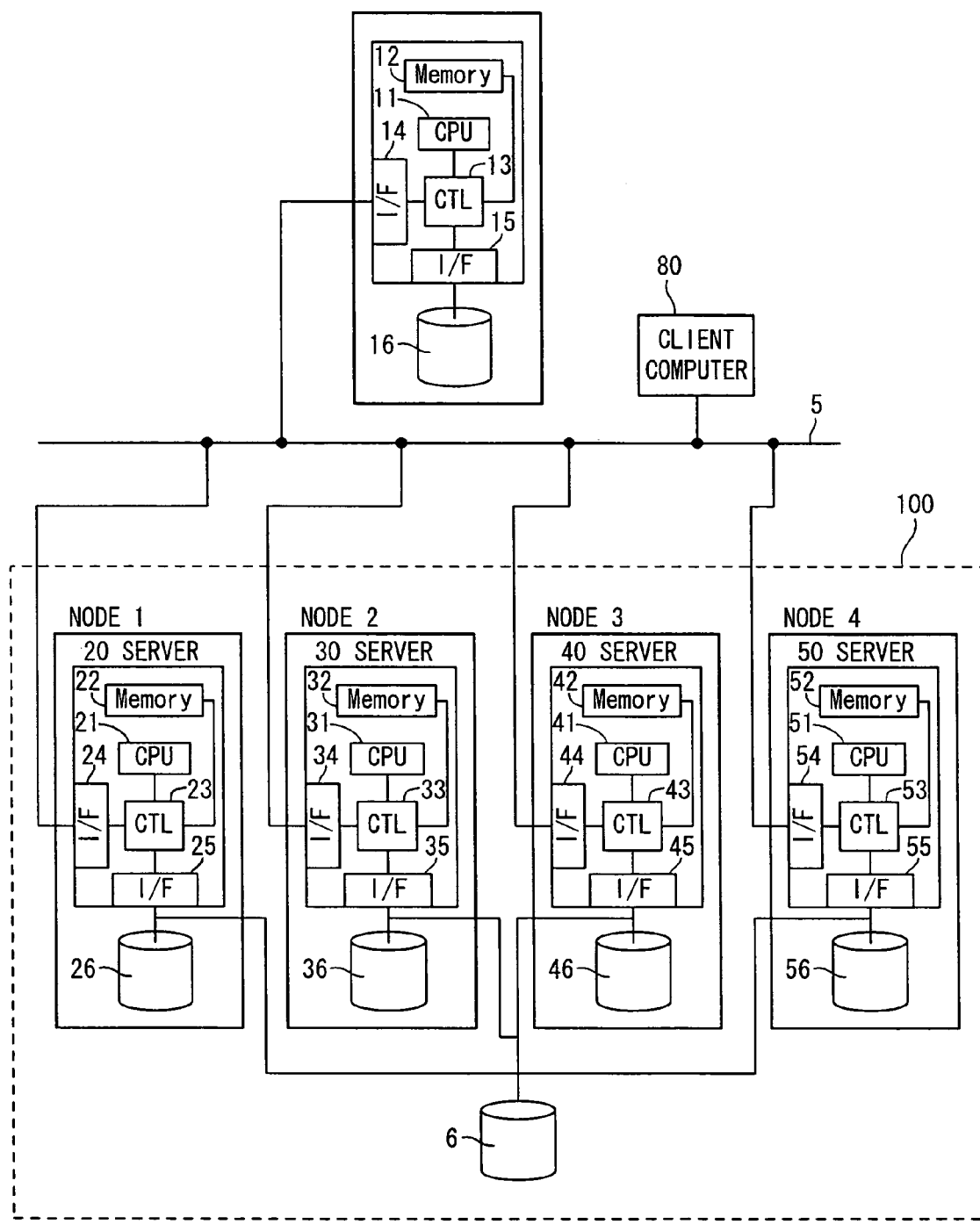
FIG. 1 is a block diagram showing an entire hardware configuration of a system according to an embodiment of this invention.
Figure 2:
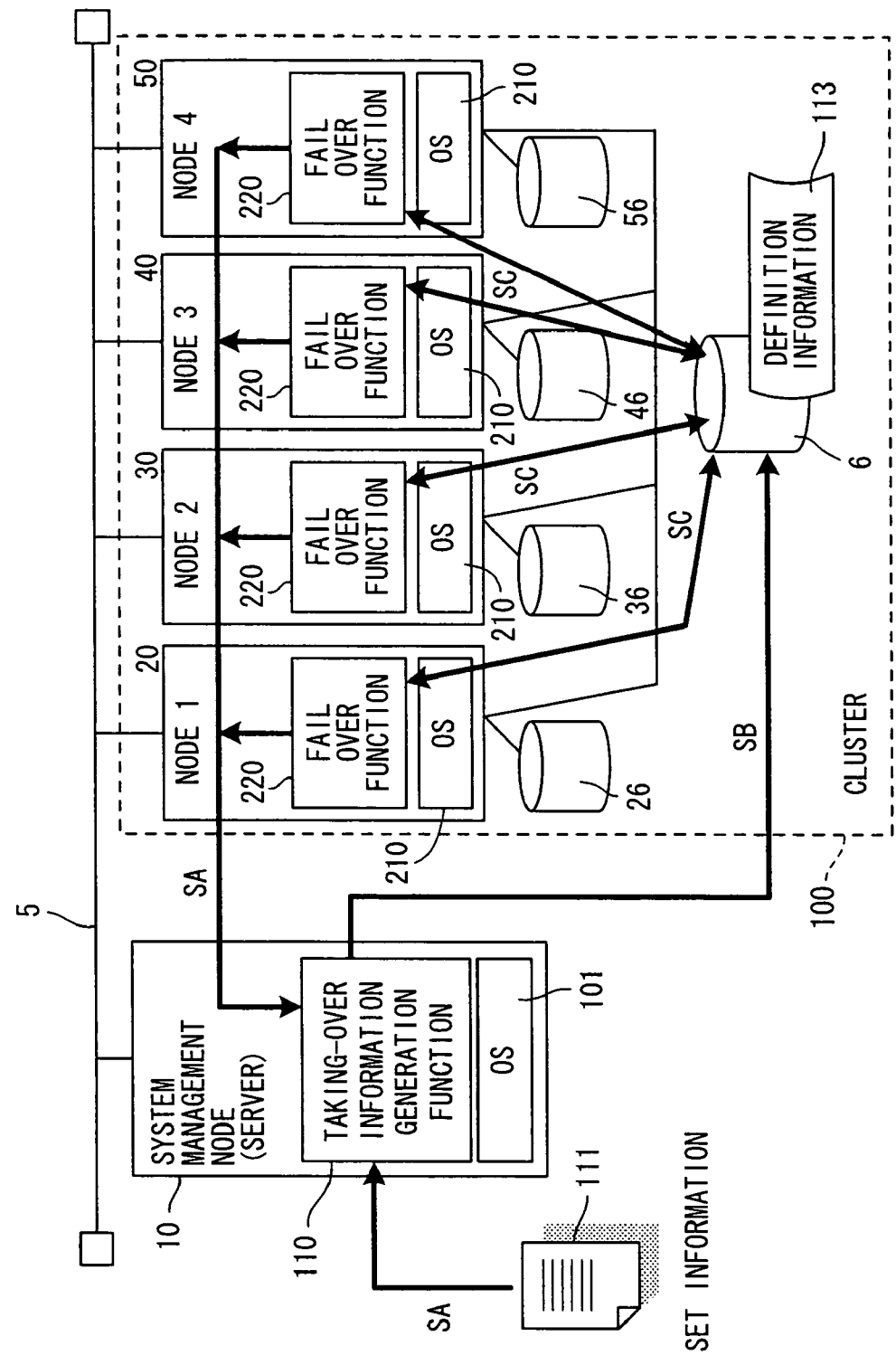
FIG. 2 is a block diagram showing an entire software configuration of the system according to the embodiment of this invention.

FIG. 1 is a block diagram showing an entire configuration of a computing system of this invention, and FIG. 2 is a block diagram showing a software configuration of the computing system.

Referring to FIG. 1, a plurality of nodes 1 to 4 constituting a cluster 100 comprise servers 20, 30, 40, and 50, and are recognized as a single server by a client computer 80 connected through a network 5.

A system management server 10 that manages the cluster 100 is connected to the network 5. As described later, the system management server 10 manages a configuration of the cluster 100 and various bits of set information, and is run by a manager or the like.

The system management server (management node) 10 comprises a CPU 11, a memory 12, a data transfer controller 13, a network interface 14, and a storage interface 15. The system management server 10 is connected to the network 5 through the network interface 14. Through the storage interface 15, the CPU 11 or the like can access a disk system 16 which stores set information or the like. Incidentally, a data cache (not shown) or the like may be disposed in the memory 12, or in the data transfer controller 13 side.

Figure 3:
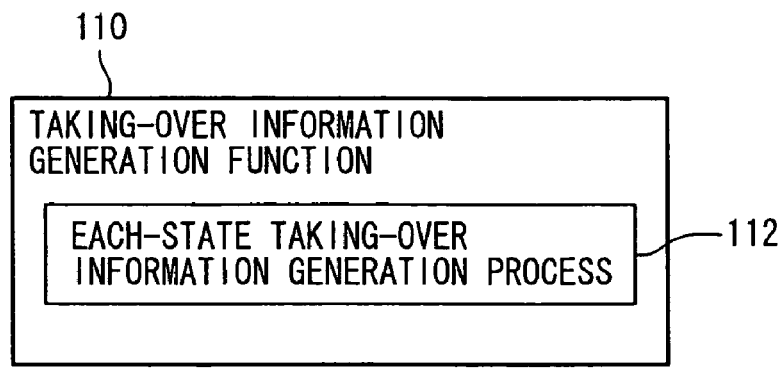
FIG. 3 is a block diagram showing a software configuration executed by a system management server according to the embodiment of this invention.

A control program shown in FIG. 3 is loaded in the memory 12, and the CPU 11 calls and executes the control program to carry out various operations (described later).

The data transfer controller 13 transfers data among the CPU 11, the network interface 14, the storage interface 15, and the memory 12.

The nodes 1 to 4 constituting the cluster 100 are interconnected to provide predetermined services in parallel. When a trouble occurs in one of the nodes, a fail over is executed to cause the other node to take over the services. After a recovery from the trouble, a fail back is executed to take over the services from the other node. The embodiment will be described by way of case in which the cluster 100 provides shared file services.

To begin with, the server 20 of the node 1 comprises a CPU 21, a memory 22, a data transfer controller 23, a network interface 24, and a storage interface 25.

The server 20 is connected to the network 5 through the network interface 24. Through the storage interface 25, the CPU 21 or the like accesses the disk system 26 which stores files. Further, the storage interface 25 is connected to a shared storage system 6 disposed outside the server 20 and shared with the other nodes (servers) to share information among the nodes.

A data cache (not shown) may be disposed in the memory 22, or in the data transfer controller 23 side.

Figure 4:
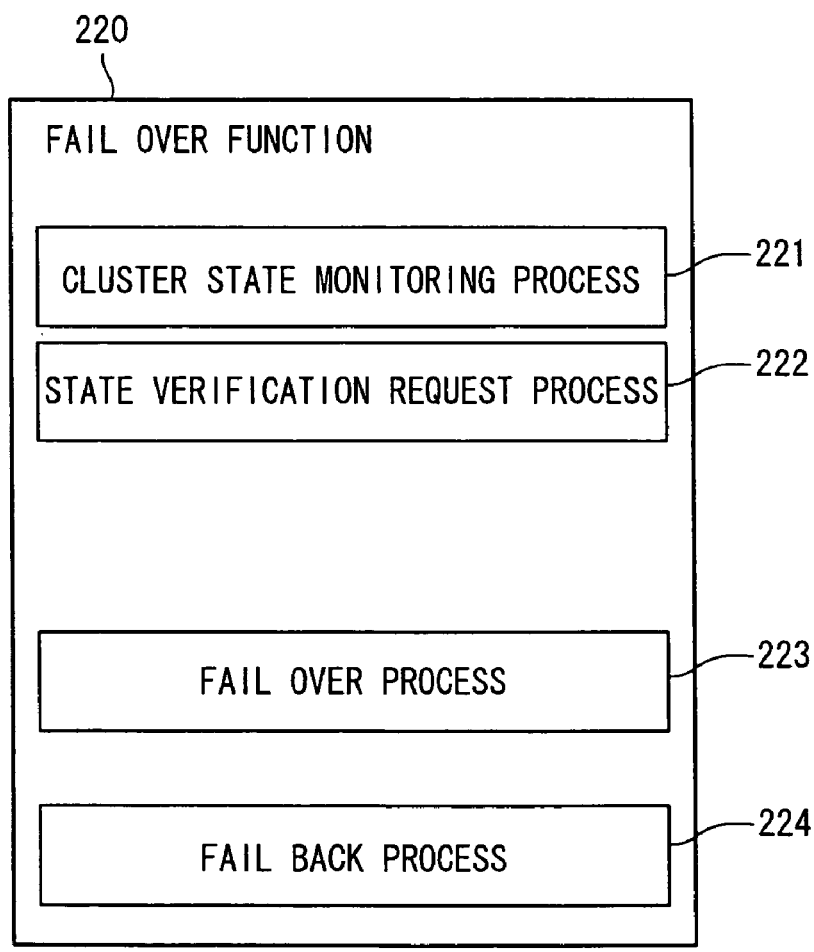
FIG. 4 is a block diagram showing a software configuration executed by each node according to the embodiment of this invention.

A control program shown in FIG. 4 is loaded in the memory 22. The CPU 21 calls and executes the control program to carry out various operations (described later).

The data transfer controller 23 transfers data among the CPU 21, the network interface 24, the storage interface 25, and the memory 22.

The server 30 of the node 2 is configured as in the case of the server 20 of the node 1, and comprises a CPU 31, a memory 32, a data transfer controller 33, a network interface 34, and a storage interface 35. The network interface 34 is connected to the network 5, and the interface 35 is connected to a disk system 36 and the shared storage system 6.

The control program shown in FIG. 4 similar to that of the server 20 of the node 1 is loaded in the memory 32. The CPU 31 calls and executes the control program to carry out various operations (described later).

The server 40 of the node 3, and the server 50 of the node 4 are configured as in the case of the server 20 of the node 1, and comprise CPU's 41 and 51, memories 42 and 52, data transfer controllers 43 and 53, network interfaces 44 and 54, storage interfaces 45 and 55. The network interfaces 44 and 54 are connected to the network 5, and the interfaces 45 and 54 are connected to disk systems 46 and 56, and the shared storage system 6.

The shared storage system 6 disposed in the cluster 100 may be a storage system physically independent of the servers 20 to 50, or a shared logical disk mutually referred to and updated by the servers 20 to 50 (nodes 1 to 4, hereinafter).

FIG. 2 is a functional block diagram of the control program executed in the system management server 10 and the cluster 100.

In the system management server 10, a taking-over information generation function 110 is executed on an OS 101. The taking-over information generation function 110 monitors the nodes 1 to 4 of the cluster 100, generates taking-over information when a fail over is carried out based on a result of the monitoring and preset information 111, and stores the taking-over information in the shared storage system 6 of the cluster 100. The taking-over information generated by the system management server 10 can be referred to by the nodes 1 to 4 in the shared storage system 6.

In the nodes 1 to 4, an OS 210 provides a file sharing function to the client computer 80, and a fail over function (processing) 220 is executed on the OS 210. The fail over function 220 includes a fail over process of causing, when one of the nodes stops due to a trouble or the like, the other nodes to refer to the taking-over information in the shared storage system 6, and to take over services (file sharing services) provided by the stopped node so that loads on the nodes can be uniform, and a fail back process of taking over, when the stopped node is recovered, the services taken over by the other nodes to the original node.

The disk systems 26 to 56 of the nodes 1 to 4 store data of different contents, and provide the file sharing services to the client computer 80. As described later, a plurality of file systems are stored in the disk systems 26 to 56 of the nodes 1 to 4, and data are stored in the file systems.

FIG. 3 shows a specific configuration of the taking-over information generation function 110 executed in the system management server 10, and the taking-over information generation function 110 includes an each-state taking-over information generation process 112. As described later, the each-state taking-over information generation process 112 monitors the states of the nodes 1 to 4, and decides processing to be taken over to the other nodes according to a state of the stopped node.

FIG. 4 shows a specific configuration of the fail over function 220 executed at the nodes 1 to 4. The fail over function 220 comprises a cluster state monitoring process 221 of monitoring the states of the nodes 1 to 4, a state verification requesting process 222 of inquiring of the other nodes the states, a fail over process 223 of taking over the services provided by the other stopped node, and a fail back process 224 of taking over the taken-over services to the recovered original node.

<Outline of Entire Process>

Next, description will be made of an outline of the process executed in the system management server 10 and the nodes 1 to 4.

First, the system management server 10 collects bits of information on resources (concerning the file system and the network) concerning the fail over from the nodes 1 to 4. The set information 111 (an upper limit of a number of taking-over times, a node number, an IP address of each node, or the like) input by the manager is stored in the memory or the disk system of the system management server (SA in FIG. 2)

Based on the bits of information collected/input to the system management server 10, resources taken over at the time of a multistage fail over and capacities of the nodes 1 to 4 are verified in the system management server 10. After completion of the verification, information regarding taking-over (each-state taking-over information) is output, and stored in the shared storage system 6 shared by the nodes 1 to 4 (SB in FIG. 2).

The fail over function 220 executed in the nodes 1 to 4 causes the nodes 1 to 4 to monitor one another, and automatically executes a fail over/a fail back based on taking-over definition information (each-state taking-over information) when there is a stopped or recovered node (SC in FIG. 2). Incidentally, in the mutual monitoring of the nodes 1 to 4, operation states are verified based on whether the nodes 1 to 4 periodically update the shared storage system 6 or not.

<Outline of Each-state Taking-over Information Generation Process 112>

Next, description will be made of an outline of the each-state taking-over information generation process 112 executed by the taking-over information generation function 110 of the system management server 10.

{STEP 1}

As shown in FIG. 5, to measure loads of services (file sharing) of the nodes 1 to 4, the system management server 10 totals the number of users of each file system provided by each of the nodes 1 to 4, and creates a file system user number list in which the number of users (current_usr_num) corresponding to a file system name is prepared for each of the nodes 1 to 4. The list is stored in the memory 12 or the disk system 16 of the system management server 10, or the shared storage system 6.

For the number of users (number of clients) for each file system, an access log is obtained from each node, and the number of access users is counted for each file system.

{STEP 2}

The system management server 10 reads the number of taking-over times (upper limit value) at the time of the fail over for each file system of each of the nodes 1 to 4 from the set information 111 set by a user such as a manager. As shown in FIG. 6, for the number of taking-over times, an upper limit value thereof corresponding to a file system name set in each of the nodes 1 to 4 is set, "3" means that the fail over is executed up to 3 times, and "0" means that the fail over is inhibited.

The number of taking-over times at the time of the fail over for each file system is preset by the manager or the like. A list shown in FIG. 6 is stored as a taking-over number list in the shared storage system 6.

Based on the taking-over number list, a file system to be taken over to the other node is selected according to the number of executed fail over times. In other words, since the number of taking-over nodes decreases as the number of fail over times increases, by reducing resources which can be taken over, it is possible to continue services by executing a multistage fail over.

The example of presetting the number of taking over times at the time of the fail over for each file system has been described. However, the number of taking over times may be automatically decided by comparing the number of users for each file system obtained in the STEP 1 with a preset threshold value.

For example, the following may be decided:

Number of users>100→number of taking-over times=3

50<number of users≦100→number of taking-over times=2

10<number of users≦50→number of taking-over times=1

Number of users≦10→number of taking-over times=0

In other words, a upper limit of the number of taking-over times for a file system high in the number of users and use frequency is set high, while an upper limit of the number of taking-over times for a file system low in the number of users or use frequency is set low.

{STEP 3}

Next, the system management server 10 obtains the maximum number of users (user number) for each of the nodes 1 to 4 from the set information 111. The maximum number of users is preset by the manager or the like based on requirements such as processing power of each of the nodes 1 to 4, and indicates the number of users who can simultaneously access each of the nodes 1 to 4 as shown in FIG. 7. Incidentally, FIG. 7 shows a table of a node number and the maximum number of users set for each node.

{STEP 4}

The system management server 10 sets a state of the cluster 100 based on the operation states of the nodes 1 to 4. Here, as shown in FIG. 8, operation/stop of the four nodes 1 to 4 will be examined for all patterns. Description will be made of an example indicating a state of the cluster 100 of a bit string of 4 bits.

As described later, the operation states of the nodes 1 to 4 are determined based on updated situation of the shared storage system 6. "0" is set in an operating node, while "1" is set in a stopped node.

In the bit string of 4 bits of (b1, b2, b3, and b4), b1 is a state of the node 1, b2 is a state of the node 2, b3 is a state of the node 3, and b4 is a state of the node 4.

A state in which all the four nodes 1 to 4 are operated indicates a bit string=(0, 0, 0, 0). This state is set as a 0th stage (fail over is 0th stage), and a name thereof is set as St0 as shown in FIG. 8.

Next, a state in which one of the four nodes is stopped is a first stage. At the first stage, there are four patterns. A state name in which the node 1 is stopped is set as St8, a state name in which the node 2 is stopped is set as St4, a state name in which the node 3 is stopped is set as St2, and a state name in which the node 4 is stopped is set as St1. The state names are based on decimal values of the bit string.

Next, a state in which two of the four nodes are stopped is a second stage. At the second stage, there are six patterns. A state name in which the nodes 1 and 4 are stopped is set as St9, a state name in which the nodes 1 and 3 are stopped is set as St10, a state name in which the nodes 1 and 2 are stopped is set as St12, a state name in which the nodes 2 and 4 are stopped is set as St5, a state name in which the nodes 2 and 3 are stopped is set as St6, and a state name in which the nodes 3 and 4 are stopped is set as St3.

Similarly, a state in which three of the four nodes are stopped is a third stage. At the third stage, there are four patterns. A state name in which the nodes 1, 2, and 3 are stopped is set as St14, a state name in which the nodes 1, 2, and 4 are stopped is set as St13, a state name in which the nodes 1, 3, and 4 are stopped is set as St11, and a state name in which the nodes 2, 3, and 4 are stopped is set as St7.

Lastly, a state in which the four nodes 1 to 4 are all stopped is a fourth stage.

Thus, the stages of the cluster 100 are indicated by the 0 to fourth stages. A cluster state list indicating the specific states of the nodes 1 to 4 by the state names and the bit string is created as shown in FIG. 8, and stored in the shared storage system 6. In other words, the cluster state list indicates all the trouble patterns of the nodes 1 to 4 which possibly occur in the cluster 100.

Now, description will be made by taking the example in which the node 1 is stopped.

When the node 1 is stopped while services are provided in the state of the cluster 100 shown in FIG. 5, St8 of the first stage is set in the cluster state list of FIG. 8, and file system names fs11, fs12, and fs13 of the number of taking-over times=3 and 2 from the taking-over number list of FIG. 6 are taken over (allocated) to the other nodes 2 to 4. As a result of the fail over process, 1 is subtracted from the number of taking-over times for all the file systems, and the taking-over number list becomes similar to that shown in FIG. 9.

In this case, the numbers of users of the file systems to be taken over are as follows from FIG. 5:

fs11 100
fs12 80
fs13 60

The numbers of users and the maximum numbers of users for the taking-over nodes 2 to 4 are as follows from FIGS. 5 and 7:

node 2 number of users=295 maximum number of users=400
node 3 number of users=248 maximum number of users=350
node 4 number of users=125 maximum number of users=400

(Allocation of Resources)

According to an exemplary method of allocating the fs11 to 13 to the nodes 2 to 4, they are allocated in order of the large numbers of users permitted to use the nodes 2 to 4 (maximum number of users−number of users) and in order of the large numbers users of the fs11 to fs13.

First, the numbers of users permitted to use the nodes 2 to 4 are as follows:

node 2=115
node 3=102
node 4=275

Thus, a result of sorting in order of the large numbers of users is nodes 4, 2, and 3. Then, a result of sorting in order of large file systems to be taken over is fs11, 12, and 13.

Accordingly, as shown in FIG. 10, the fs11 is allocated to the node 4, the fs12 is allocated to the node 2, and the fs13 is allocated to the node 3. As a result, it is possible to allocate resources to be taken over to the nodes 2 to 4 by suppressing the uneven numbers of users.

In the case of allocation, limits may be set so that the number of users permitted to use the nodes 2 to 4 can be equal to or higher than 10% of the maximum numbers of users. By setting such limits, it is possible to deal with data increases of the file systems.

When the allocation fails, the numbers of taking-over times or the maximum numbers of users are reviewed to start again from the STEP 1.

The allocation has been described by taking the example of the state name St1. For the state names St2 to St14, allocation of the file systems will similarly be examined.

{STEP 5}

As a result of the STEP 4, for the state names St0 to St14, a resource taking-over list similar to that shown in FIG. 11 can be obtained.

For each of the state name St0 in which all the nodes 1 to 4 are operated to the sate name St14 in which one node only is operated, the resource taking-over list is created before a fail over or a fail back in a case in which a resource (file system) allocated to each node is allocated not to exceed a range of a maximum value (maximum number of users) permitted to each of the nodes 1 to 4.

Then, as in the case of the example of the STEP 4, when the node 1 is stopped to change the state name from St0 to St8, the fs11 to 13 are allocated to the nodes 2 to 4 as in the state name St8 of FIG. 11.

{STEP 6}

The resource taking-over list of FIG. 11 created in the STEPS 4 and 5 is stored in the shared storage system 6.

{STEP 7}

Next, after completion of the resource allocation, a taking-over state of an address (e.g., IP address) at the time of the fail over is generated.

For example, as in the above example, in the state name S8 in which the node 1 is stopped, an IP address of the node 1 is allocated to the other nodes 2 to 4.

Alternatively, when two nodes are stopped, for example, when the nodes 2 and 4 are stopped as in the case of the state name S5 and the nodes 1 and 3 take over, the following is executed.

First, operating nodes and the number thereof, and stopped nodes and the number thereof are obtained from a current state of the cluster 100. Then, a list enumerating the operating nodes is created as node_list_alive shown in FIG. 12.

Similarly, a list enumerating stopped nodes is created as node_list_down shown in FIG. 13.

Next, IP addresses of the nodes in the node_list_down are allocated one by one to the nodes in the node_list_alive in order of high nodes of the list.

When the nodes of the node_list_down remain, returning to the head of the nodes of the node_list_alive, the IP addresses of the nodes of the node_list_down are allocated again in high order of the nodes of the list.

In the case of the state name S5, the followings are allocated from FIGS. 12 and 13:

node 1: IP address of node 2
node 3: IP address of node 4

The above process is carried out for each of the state names St1 to St14. For each of the state names St0 to St14, an address taking-over list at the time of a fail over is created as shown in FIG. 14, and stored in the shared storage system 6.

The STEPS 1 to 7 constitute the outline of the each-state taking-over information generation process 112. By executing the process at a predetermined cycle (e.g., every few seconds), the taking-over number list, the cluster state list, the resource taking-over list, and the address taking-over list are updated to latest lists in the shared storage system 6. Incidentally, the cluster state list, the resource taking-over list, and the address taking-over list constitute each-state taking-over information.

<Outline of Cluster State Monitoring Process 221>

Description will be made of an outline of the cluster state monitoring process 221 of the fail over function 220 executed at the nodes 1 to 4.

The nodes 1 to 4 monitor one another to determine whether the other nodes periodically update the verification table or not by referring to the verification table shown in FIG. 15 set in the shared storage system 6 at a predetermined cycle (monitoring interval, e.g., 30 seconds to 1 minute).

Additionally, the nodes 1 to 4 execute monitoring when state verification notices are received from the other nodes.

When an updating interval of the verification table becomes larger than a preset value (trouble determination time, e.g., 10 minutes), an occurrence of a trouble of a node in question is determined. Each node determines an operation/a stop regarding each node other than own, and specifies a cluster state (St0 to St14). To notify that the own node is alive, an area of the own node in the verification table of the shared storage system 6 is updated. As shown in FIG. 15, the updating is executed by writing a time stamp and the state (operation/stop (down)).

By referring to the verification table of the shared storage system 6, each of the nodes 1 to 4 specifies a state of the cluster 100, and compares the previously specified state with the latest state. When a state change is detected, the node determines a node trouble occurrence or a troubled node recovery (determine based on an increase/decrease in the bit number of the bit string of FIG. 8). When the ongoing process is not a fail over or a fail back, the node starts a fail over process by increasing the bit number (increase of on-bits), or a fail back process by decreasing the bit number (decrease of on-bits).

<Outline of Fail Over Process 223>

Description will be made of an outline of the fail over process 223 of the fail over function 220 executed at the nodes 1 to 4.

{Step 1} Deciding of Master/Slave

To decide a node which becomes a master at the time of a fail over, the node refers to the verification table of the shared storage system 6, and becomes a master itself when its own node number (e.g., Node X) is smallest, and a slave otherwise.

{Step 2—Master}

When being a master itself, the node makes a shut-down request to the stopped node, and stops the node. Subsequently, the state verification request process 222 (described later) is called to verify a taking-over state of the other node.

Then, the system management server 10 obtains resources to be released and resources to be taken over from the each-state taking-over information of the shared storage system 6, and executes resource taking-over after releasing of the resources to be released.

{Step 2—Slave}

When being a slave itself, the node receives a state verification request from a node which is a master, and resumes the fail over process.

By the above process, the fail over process is carried out based on the each-state taking-over information of the shared storage system 6.

Specifically, the system management server 10 executes the each-state taking-over information generation process 112 at a predetermined cycle, and updates the each-state taking-over information of the shared storage system 6 during the operation of the cluster 100. Then, when one of the nodes is stopped, each of the nodes 1 to 4 takes over resources and addresses based on the each-state taking-over information generated by the system management server 10.

Thus, each of the nodes 1 to 4 needs carry out no arithmetic operation such as adjustment of allocation regarding taking-over, and can complete the fail over process at a very high speed. Moreover, since the each-state taking-over information is generated beforehand by the system management server 10 for all the states to be subjected to a fail over, and verified, it is possible to make adjustments so as to prevent great uneven allocation of resources to be taken over among the nodes, and to make uniform loads of the nodes 1 to 4.

<Outline of Fail Back Process 224>

Description will be made of an outline of the fail back process 224 of the fail over function 220 executed at the nodes 1 to 4.

{Step 1} Deciding of Master/Slave

To decide a node which becomes a master at the time of a fail back, the node refers to the verification table of the shared storage system 6, and becomes a master itself when its own node number (e.g., Node X) is smallest, and a slave otherwise.

{Step 2—Master}

When being a master itself, the state verification request process 222 (described later) is called for the other operating node to verify a taking-over state of the other node.

Then, the system management server 10 obtains resources to be released and resources to be taken over from the each-state taking-over information of the shared storage system 6, and executes resource taking-over after releasing of the resources to be released.

{Step 2—Slave}

When being a slave itself, the node receives a state verification request from a node which is a master, and resumes the fail back process.

In the case of the fail back process, as in the case of the fail over process, each of the nodes 1 to 4 needs carry out no arithmetic operation such as adjustment of allocation regarding taking-over, and only deeds refer to the each-state taking-over information of the shared storage system 6. Thus, the fail back process can be completed at a very high speed.

<Outline of State Verification Request Process 222>

Description will be made of an outline of the state verification request process 222 of the fail over function 220 executed at each of the nodes 1 to 4.

In the process, states (St0 to St14) recognized by the master node are transmitted to the slave node. Then, responses are received from all the slave nodes, and verification is made as to whether the states are coincident at all the nodes or not.

The outlines of the taking-over information generation function 110 of the system management server 10 and the processes of the fail over function 220 of the nodes 1 to 4 have been described.

Next, referring to a flowchart, an operation of each process will be described in detail.

<Details of Each-state Taking-over Information Generation Process 112>

Referring to a flowchart of FIG. 16, specific processing contents of the each-state taking-over information generation process 112 executed by the taking-over information generation function 110 of the system management server 10 will be described hereinafter. The process of the flowchart is carried out at a predetermined cycle (e.g., few seconds).

In steps S201 through S210, as described above in the STEP 1, the system management server 10 obtains the number of users for the file system of each of the nodes 1 to 4.

First, in the step S201, a variable k to specify a node is initialized to 1. Then, in the step S202, the system management server 10 connects to the node (k) indicated by the variable k.

Next, in the step S203, a variable l to specify a file system of each node is initialized to 1. Then, the system management server 10 specifies a file system (i) indicated by the variable i in the step S204, and obtains a name of a file system (l) and the number of users from the node (k) in the step S205. The node (k) counts the number of access users for each system from an access log, and notifies the file system name and the current number of users to the system management server 10. Incidentally, the variable l is for sequentially scanning the file systems from the head in the node (k).

In the step S206, the system management server 10 outputs the file system name and the current number of users obtained from the node (k) to the memory 12 or the like.

Then, in the step S207, determination is made as to whether the last file system of the node (k) has been reached or not. If the last file system has not been reached, the process proceeds to the step S210 to increment the variable l, and then proceeds to the step S204 to obtain the number of users for the next file system.

On the other hand, if the final file system has been reached, the process proceeds to the step S208 to determine whether the last node of the cluster 100 has been reached or not. If the last node has not been reached, the process proceeds to the step S209 to increment the variable k, and then returns to the step S202 to investigate the file system for the next node (k).

If the final node has been reached, the process proceeds to a step S211.

At a point of this time, since the file system names and the current numbers of users have been obtained for all the file systems of all the nodes 1 to 4, a file system user number list similar to that shown in FIG. 5 is created in the memory 12 of the system management server 10, and a list of resources provided by the current cluster 100 is created.

In the process of the step S201 to the step S210, after the creation of the file system user number list, taking-over information at the time of a fail over is generated according to the states S0 to S14 of the cluster 100 in the step S211 and after.

In the step S211, the taking-over number list shown in FIG. 6 for each of the nodes 1 to 4 based on the set information 111 is read, and the maximum number of users shown in FIG. 7 for each of the nodes 1 to 4 is read from the set information 111. Incidentally, a value read from the set information 111 in the first processing is written in the shared storage system 6, and then the taking-over number list is updated according to a fail over or a fail back.

Next, in a step S212, a variable x for setting the stages St0 to St14 of the cluster 100 is initialized to 0.

In a step S213, as shown in the STEP 4 and FIG. 8, a node which becomes a taking-over side in the case of a state St(x) is obtained. In a step S214, a file name and the number of users for each node of a taking-over side are obtained from the taking-over number list and the file system user number list.

In a step S215, the maximum number of users for each node of the taking-over side is obtained from the set information 111 read in the step S211.

Then, in a step S216, taking-over information of the state St(x) is generated as described in the STEPS 4 and 5. This process will be described later.

In a step S217, determination is made as to whether error has occurred or not in the taking-over information generation of the step S216. If there is an error, the process proceeds to a step S223 to notify the error to the system management server 10.

If there is no error, the process proceeds to a step S218 to determine whether the preset last state St(x) has been set or not. According to the embodiment, x=14 is a last state. If the last state has not been reached, the process proceeds to a step S222 to increment the variable x (add 1), and then returns to the step S213 to generate taking-over information for the next state St(x).

In the step S218 in which the taking-over information has been generated for all the states St(x), as shown in FIG. 11, the state St(x) is set as a state name, and a resource taking-over list enumerating the file system names to be taken over for the nodes of the taking-over side is output (updated) to the shared storage system 6.

Next, in a step S220, as described in the STEP 7, IP address taking-over information is generated for each state St(x). In a step S221, as shown in FIG. 14, the state St(x) is set as a state name, and an address taking-over list enumerating IP addresses taken over for the nodes of the taking-over side is output (updated) to the shared storage system 6.

By the above process, the system management server 10 detects a load (number of users) of each of the nodes 1 to 4 at the predetermined cycle, and outputs and updates the taking-over information at the time of the fail over as the lists of resources and addresses distributed according to the loads to the shared storage system 6.

{Resource Taking-Over Information Generation for Each State St(x)}

Figure 17:
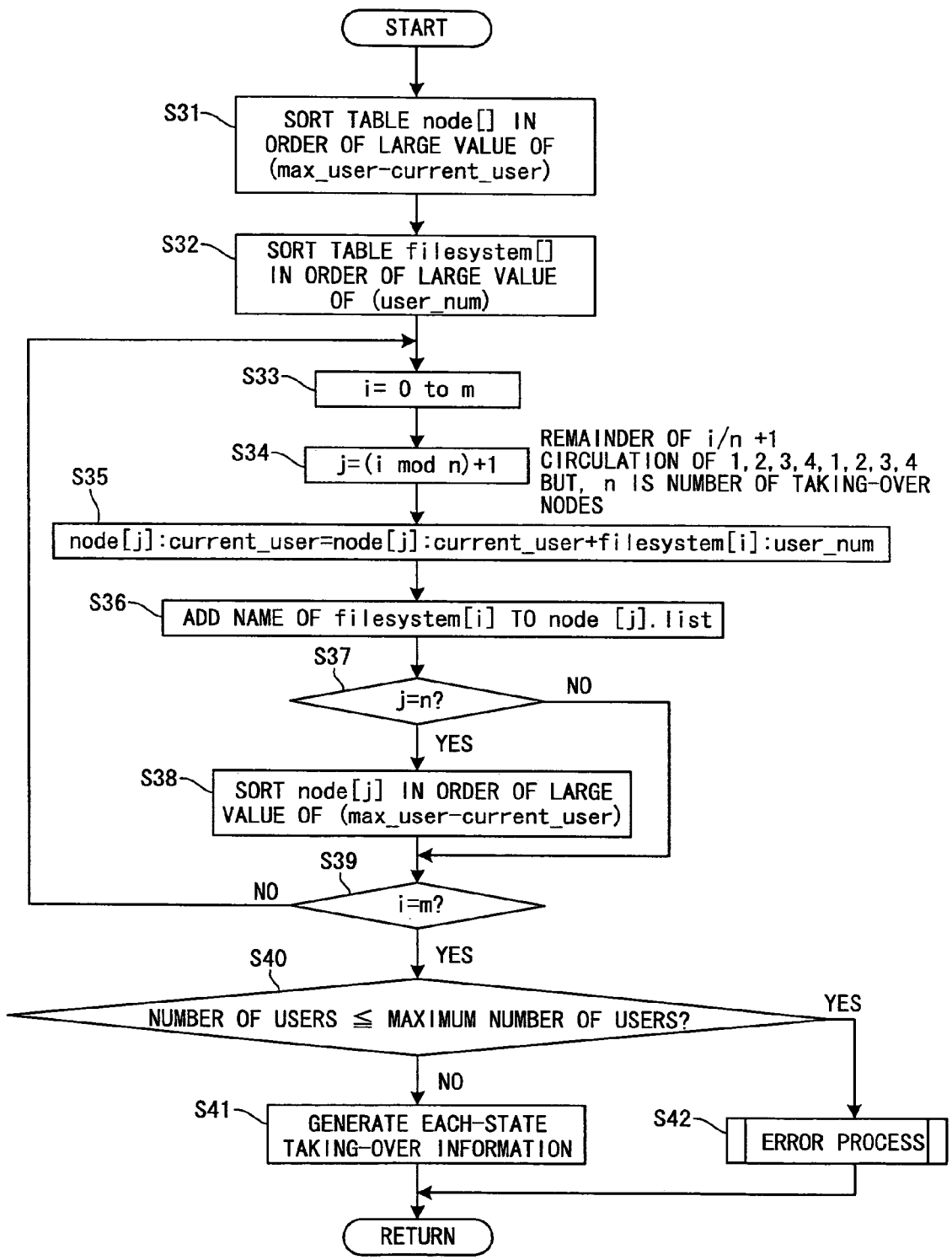
FIG. 17 is a diagram showing a subroutine of resource taking-over information generation of states executed in a step S216 of FIG. 16 according to the embodiment of this invention.

Next, referring to a subroutine of FIG. 17, the resource taking-over information generation executed for each state St(x) in the step S216 will be described in detail.

In a step S31, the current number of node users is obtained as current_user from the file system name and the number of users of the node of the taking-over side obtained in the step S214. Additionally, the maximum number of users obtained in the step S211 is set as max_user.

Then, the number of users permitted to use each node is calculated as max_user-current_user.

The node table of the cluster 100 shown in FIG. 7 is read in the memory 12 or the like, and set as a table node. The node numbers are sorted in order of obtained large numbers of permitted users.

Next, in a step S32, the file system user number list of FIG. 5 is read in the memory 12 or the like, and set as a table filesystem. The file system names are sorted in order of large numbers of users (user_num) from the file system and the number of users for each node obtained in the step S213.

In a step S33 and after, resource taking-over information of a current state St(x) is generated by a loop process.

First, in the step S33, a loop counter i is set to 0, and a loop is executed up to a predetermined value m. It should be noted that the predetermined value m is set to the number of the file systems for each of the nodes.

In a step S34, an arithmetic operation is carried out by setting the number of nodes which become taking-over sides in the current state St(x) as n, and a variable j as follows;

$$j = (i \bmod n) + 1$$

The mod is an operator for obtaining a remainder of i/n.

As a result of the arithmetic operation, the variable j circulates from 0 to n according to an increase of a loop counter i.

In a step S35, a node is specified by the variable j (node [j]), and the number of users (user_num) of the file system name (filesystem [i]) indicated by the loop counter i is added to the number of node users current_user.

In a step S36, a list node [j].list to which the file system name (filesystem [i]) is added is added to the specified node (node [i]). The node [j].list is equivalent to the node number and the file system name of the resource taking-over list, and set in the memory 12 or the like of the system management server 10.

In a step S37, determination is made as to whether the variable j has reached a value n equivalent to the number of taking-over nodes or not. If not reached, the process proceeds to a step S39. If reached, the process proceeds to a step S38 to sort the table node [j] again in order of large numbers of permitted users.

In the step S39, determination is made as to whether the loop counter i has reached a predetermined maximum value m or not. In the case of i<m, the process returns to the step S33 to set i=i+1, and sets a file system name for the next node. In the case of i=m, the process proceeds to a step S40 to determine whether the number of users of each node has exceeded the maximum number of users set in FIG. 7 or not. If it has not exceeded the maximum number, in a step S41, a list node [j].list to which the file system name has been allocated is output to the memory 12 or the like for each taking-over node in the current state St(x).

Figure 16:
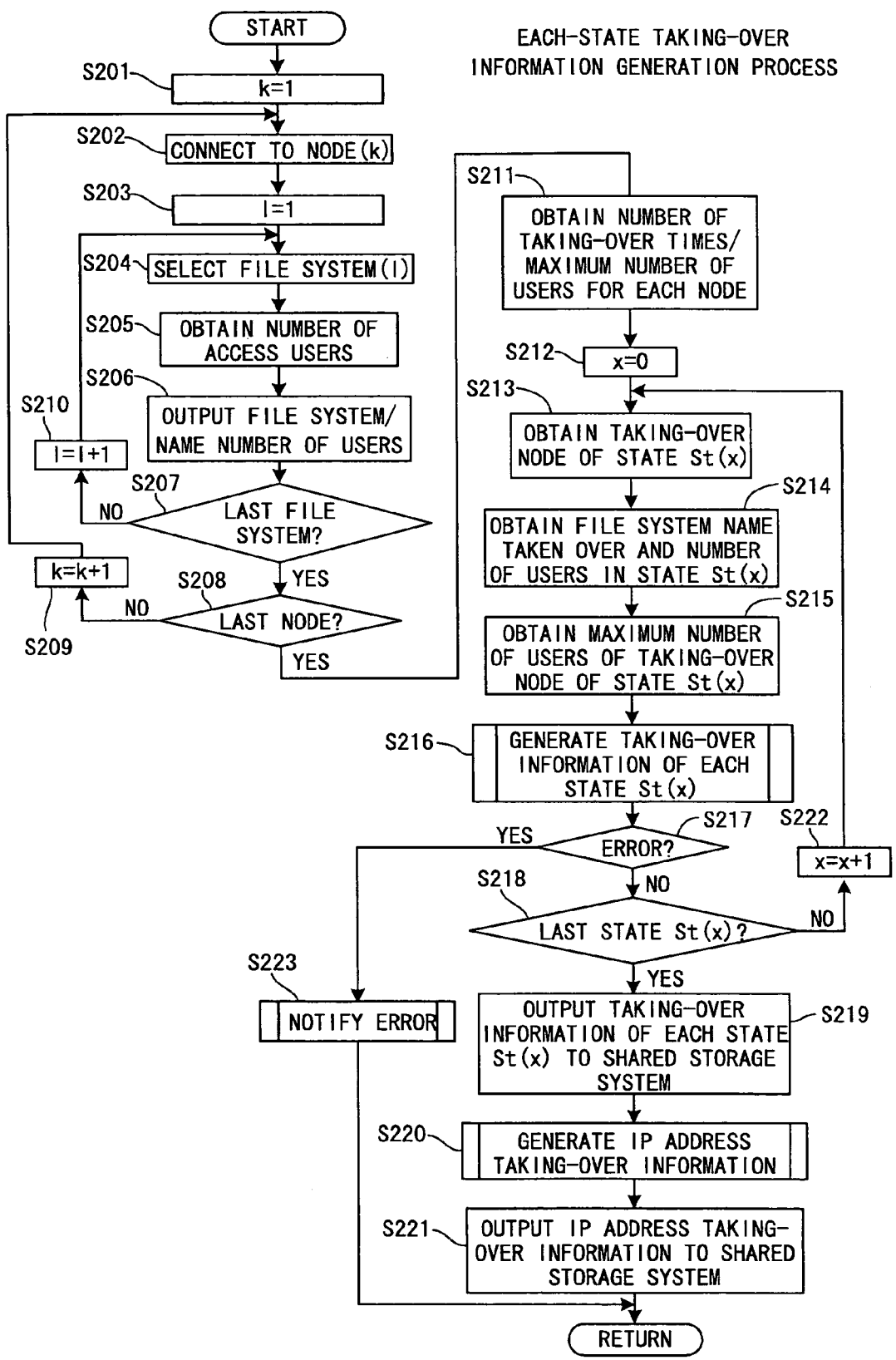
FIG. 16 is a flowchart of an example of taking-over information generation of states executed by the system management server according to the embodiment of this invention.

On the other hand, if the number of users of each node has exceeded the maximum number of users, in a step S42, error processing is executed to notify the error in the step S223 of FIG. 16.

By the above subroutine, the numbers of permitted users (maximum number−number of users which have used) capable of accommodating the nodes are sorted in order of large numbers. Then, resources (file systems) to be taken over are sorted in order of large numbers of users.

The file systems are allocated one by one to the nodes in the sorted order, and the number of users of each node is updated.

Then, the file system allocation is carried out until there are no more unallocated file systems, and the number of users of each node is compared with the maximum number of user thereof. If all are within the maximum number of users, or within a permissible range (e.g., maximum user number× 20% or the like), this allocation is output to the each-state taking-over information. Otherwise, the process is interrupted, the input information (taking-over number setting information or maximum number of users) or the like is reviewed, and the process is reexecuted.

{Resource Taking-over Information Generation for State St(x)}

Figure 18:
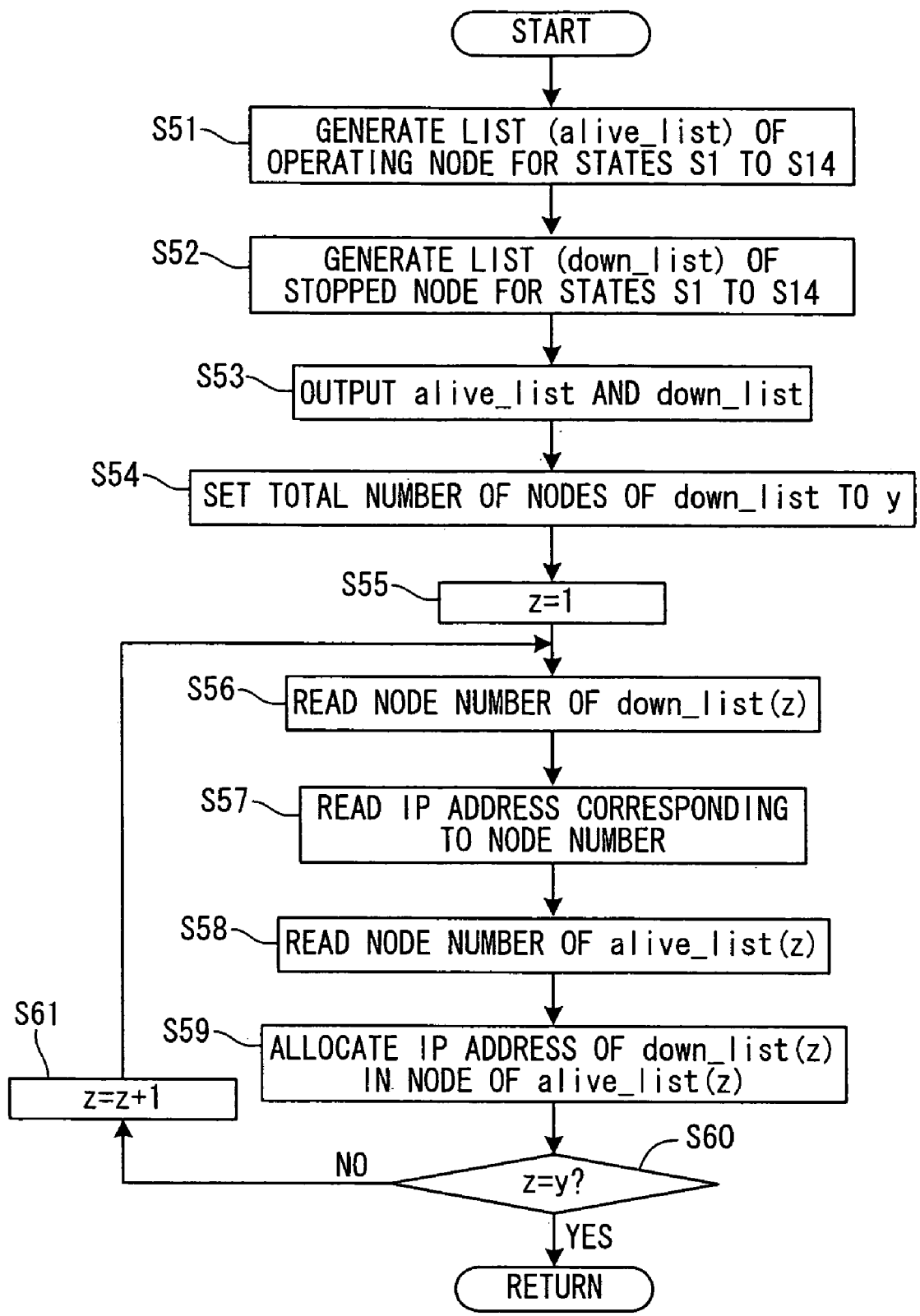
FIG. 18 is a diagram showing a subroutine of address taking-over information generation executed in a step S220 of FIG. 16 according to the embodiment of this invention.

Next, referring to a subroutine of FIG. 18, the address taking-over information generation for each state St(x) executed in the step S220 will be described in detail.

In a step S51, operating nodes are totaled for each of the states St1 to St14 (x=1 to 14), and the Node_list_alive (alive_list in the drawing) of FIG. 12 is created.

In a step S52, stopped nodes are totaled for each of the states St1 to St14 (x=1 to 14), and the Node_list_down (down_list in the drawing) of FIG. 13 is created.

In a step S53, the Node_list_alive and the Node_list_down are output to the memory 12 or the like.

In a step S54, the total number of nodes for the Node_list_down is set to y, and a variable Z is initialized to 1 in a step S55.

In a step S56, node numbers are sequentially read from the Node_list_down indicated by the variable z. In a step S57, IP addresses corresponding to the node numbers are obtained from the set information 111.

Next, in a step S58, node numbers are sequentially read from the Node_list_alive indicated by the variable z. In a step S59, the IP addresses obtained in the step S57 are allocated to the node numbers of the Node_list_alive indicated by the variable z.

In a step S60, determination is made as to whether the last Node_list_down has been reached or not. If not reached, in a step S61, the variable z is incremented, and the process returns to the step S56 to sequentially allocate node IP addressees written in the Node_list_down from the head of the nodes written in the Node_list_alive.

By the above subroutine, the address taking-over list shown in FIG. 14 is created.

<Details of Cluster State Monitoring Process 221>

Figure 19:
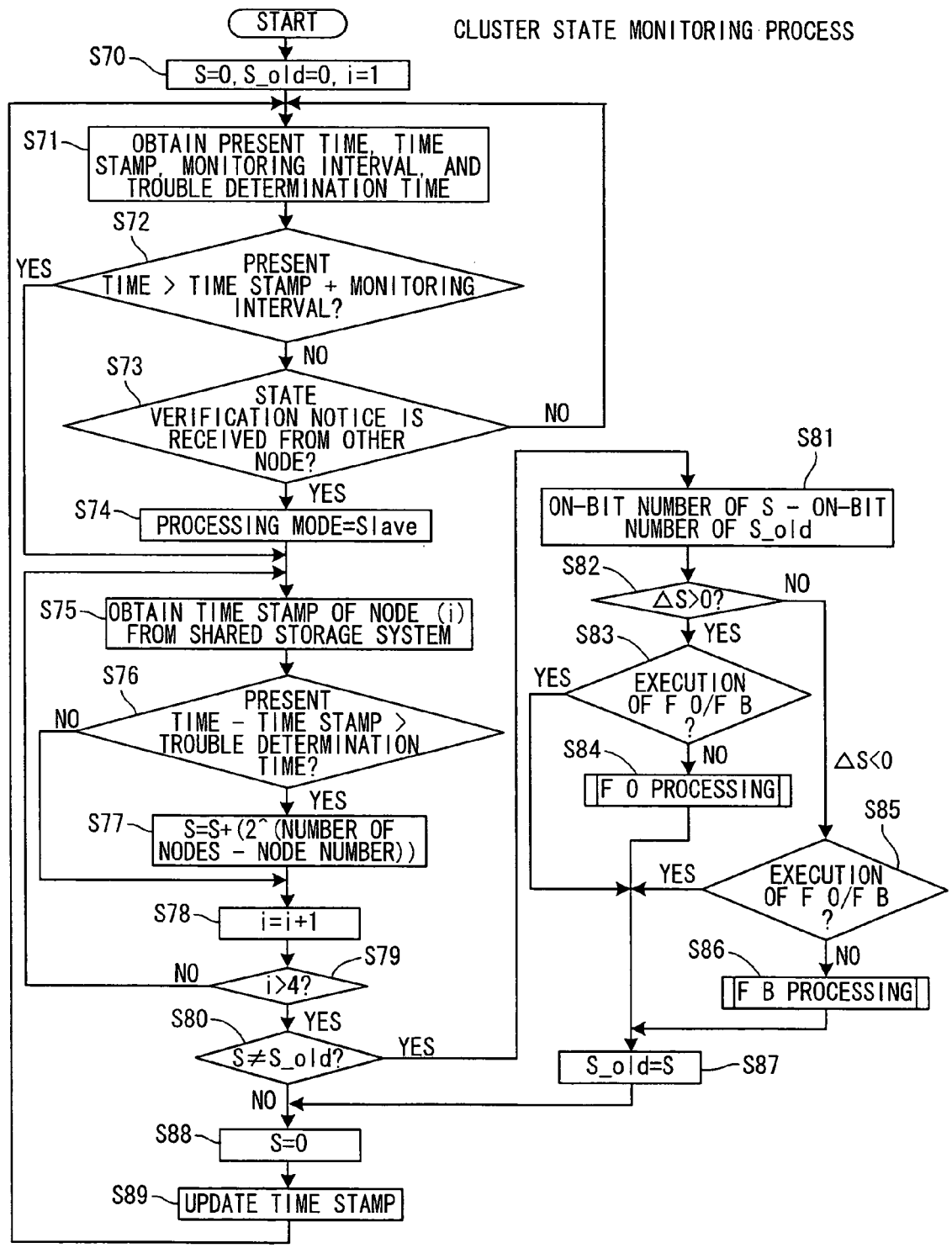
FIG. 19 is a flowchart of an example of cluster state monitoring executed at each node according to the embodiment of this invention.

Referring to a flowchart of FIG. 19, specific processing contents of the cluster state monitoring process 221 executed by the fail over function 220 of the nodes 1 to 4 will be described hereinafter. The process of the flowchart is repeatedly carried out by time division or the like.

In a step S70, a variable S indicating a current state and a variable S_old indicating a previous state are reset, and the counter i is set to 1.

In a step S71, a present time is obtained from the OS 210 or the like, and a time stamp of an own node is obtained from the verification table of the shared storage system 6. Additionally, a monitoring interval and a trouble determination time are obtained from the set information 111 of the system management server 10.

In a step S72, determination is made as to whether the present time is larger or not than a value obtained by adding a predetermined monitoring interval (e.g., 30 seconds to 1 minute) to the time stamp of the own node. In the case of present time>time stamp+monitoring interval, the process proceeds to a step S75. In the case of present time≦time stamp+monitoring interval, the process proceeds to a step S73.

In the step S73, determination is made as to whether a state verification notice has been received or not from the other node. If the notice has been received, the own node is set as a slave in a step S74. If no notice has been received, the process returns to the step S71 to repeat a loop of standing by until a passage of the monitoring interval or reception of a state verification request from the other node.

In the step S75, a time stamp of a node (i) according to the counter i is obtained from the verification table of the shared storage system 6.

In a step S76, determination is made as to whether a value obtained by subtracting the obtained time stamp from the present time exceeds the trouble determination time or not. In the case of present time−time stamp>trouble determination time, since a trouble is suspected to be present in the node (i), the process proceeds to S77 to update the variable S. In the case of present time−time stamp≦trouble determination time, since a normal operation can be determined, the process proceeds to S78.

In the step S77, the variable S indicating the cluster state corresponding to the bit string of FIG. 8 is updated as represented by the following expression:

$$S = S + (2^{\wedge}(\text{number of nodes} - \text{node number})).$$

From this operation, a bit corresponding to the troubled node is changed to ON (=1).

In the step S78, the counter i is incremented. In a step S79, determination is made as to whether the counter i has exceeded the total number of nodes of the cluster 100 or not. If not exceeded, the process returns to the step S75 to monitor the next node. If exceeded, since all the nodes have been monitored, the process proceeds to the step S60.

In the step S60, determination is made as to whether the variable S indicating the state of the cluster 100 has changed or not from the previous value S_old.

In the case where S matches S_old, because of no change in each node, the variable S is returned to 0 in a step S88. Then, in a step S89, the time stamp of the own node is updated by the present time in the verification table of the shared storage system 6.

On the other hand, in the case where S does not match S_old, the process proceeds to a step S81 to detect the change in the state of the cluster 100. In other words, a change amount ΔS is obtained by subtracting the number of on-bits in the variable S=S_old indicating the previous state from the number of on-bits (number of stopped nodes) in the variable S indicating the current state.

In a step S82, if the change amount ΔS is larger than 0, since a fail over process is necessary due to an increase in the number of stopped nodes, the process proceeds to a step S83. If the change amount ΔS is smaller than 0, since a fail back process is necessary due to a reduction in the number of stopped nodes (recovery), the process proceeds to a step S85.

In the step S83, determination is made as to which of a fail over process and a fail back process is in execution at present. If one of the processes is being executed, the process proceeds to a step S87 without executing a fail over process. If neither is being executed, a fail over process starts in a step S84. It should be noted that for the determination as to which of the fail over process and the fail back process is in execution, when the own node is a slave, the other node is inquired of to confirm whether or not the process is in execution.

In the step S84, the fail over process is executed as described later, and the process proceeds to the step S87.

In the step S85, determination is made as to which of a fail over process and a fail back process is in execution at present. If one of the processes is being executed, the process proceeds to a step S87 without executing a fail back process. If neither is being executed, a fail back process starts in a step S86. In the step S86, the fail back process is executed as mentioned below, and the process proceeds to the step S87.

In the step S87, the previous value S_old is updated by the current state S, and the process proceeds to the step S88.

Thus, at each of the nodes 1 to 4, the operation/stop of the other nodes are monitored based on the time stamp read from the verification table of the shared storage system 6. When there is a change in the bit string of the variable S, the fail over process or the fail back process is carried out. However, if the fail over process or the fail back process has been executed, the previous value S_old only is updated.

<Details of Fail Over Process 223>

Figure 20:
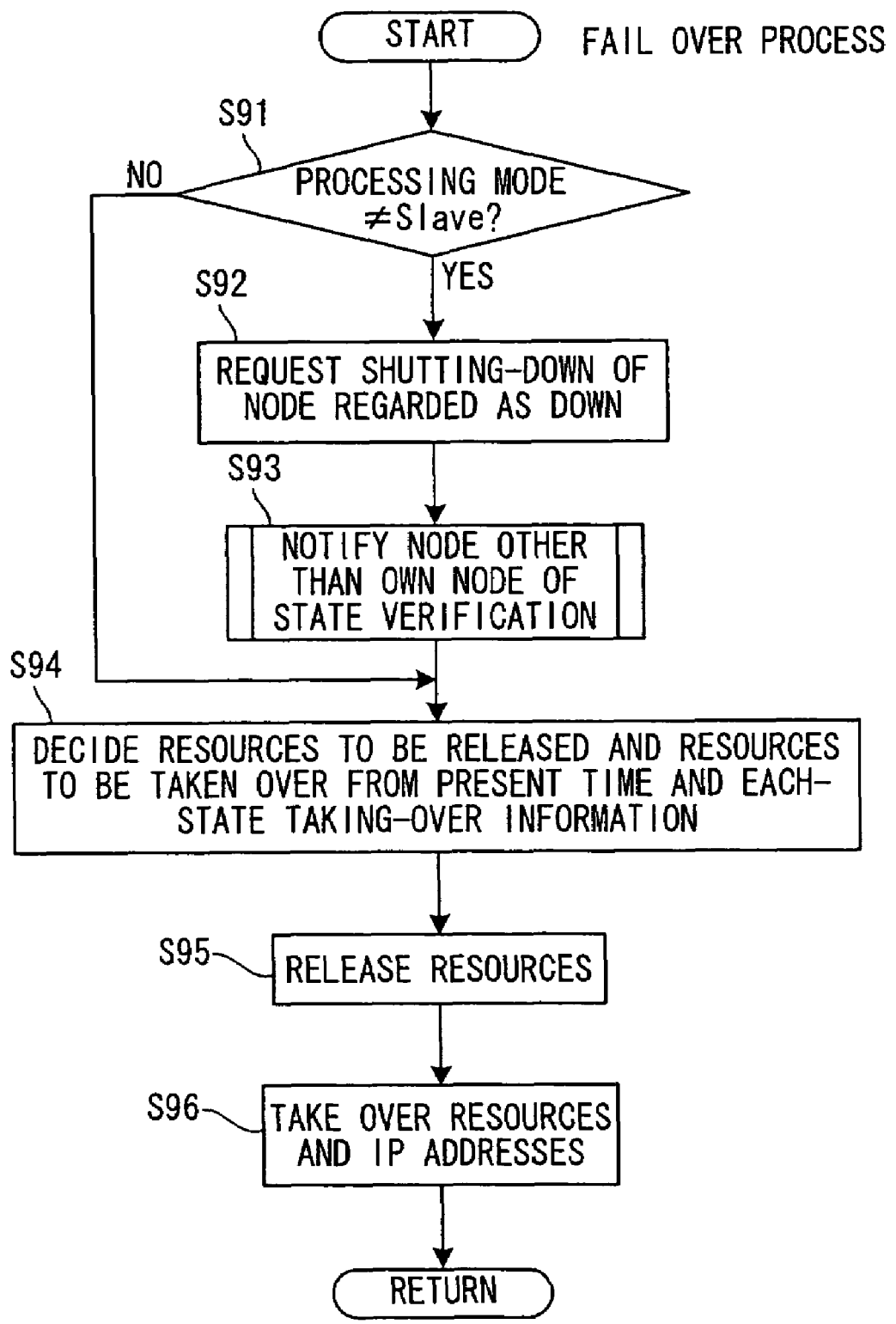
FIG. 20 is a flowchart of an example of a fail over process started in a step S84 of FIG. 19 according to the embodiment of this invention.

Referring to a flowchart of FIG. 20, specific processing contents of the fail over process 223 executed by the fail over function 220 of each of the nodes 1 to 4 will be described hereinafter. The process of the flowchart starts in the step S84 of FIG. 19 independently of that of the cluster state monitoring process 221. The process of FIG. 20 can be a subroutine of the step S84.

In a step S91, determination is made as to whether the own node is a master or a slave. If the own node is a master, the process proceeds to a step S92. If the own node is a slave, the process proceeds to a step S94.

In the step S92, a node determined to be stopped is required to be shut down. Subsequently, in the step S93, a state verification request is made to the other nodes (taking-over nodes other than the own node).

Subsequently, in the step S94, the resource taking-over list and the address taking-over list are read from the each-state taking-over information of the shared storage system 6. From the read lists and the current state (variable S in FIG. 19), resources to be released and resources to be taken over are decided.

Then, in a step S95, the resources decided in the step S94 are released. Subsequently, in a step S96, the resources are taken over (file systems are mounted or the like), and the IP addresses are taken over to finish the process.

Thus, in the fail over process, if the current state S is known, only by reading the resource taking-over list and the address taking-over list according to the state S, it is possible to decide the resources and the IP addresses to be taken over, and to carry out the fail over process at a very high speed.

Furthermore, since the fail over process is carried out in parallel at the taking-over nodes, a much higher-speed process can be realized.

<Details of Fail Back Process 224>

Figure 21:
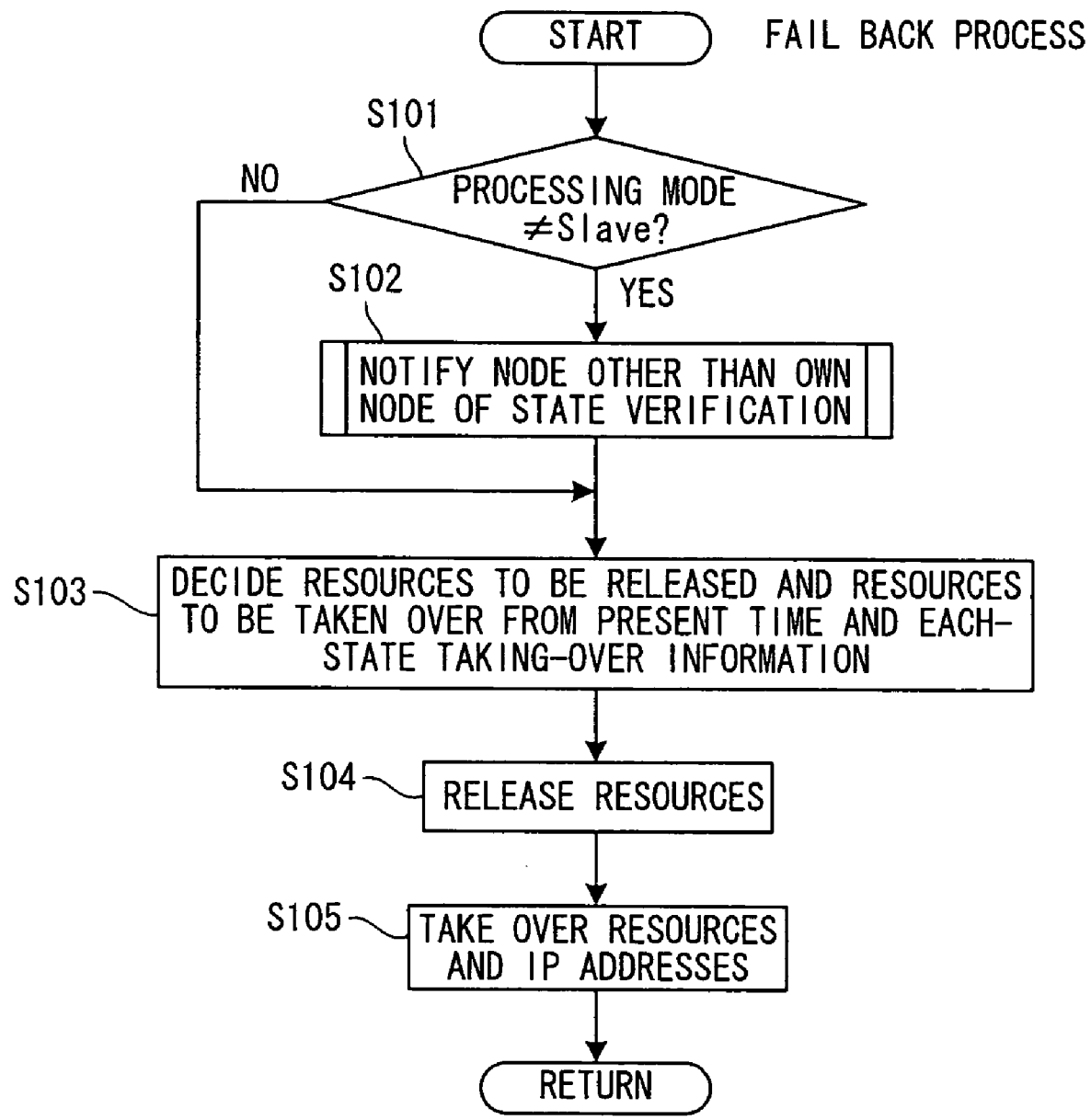
FIG. 21 is a flowchart of an example of a fail back process started in a step S86 of FIG. 19 according to the embodiment of this invention.

Referring to a flowchart of FIG. 21, specific processing contents of the fail back process 224 executed by the fail over function 220 of each of the nodes 1 to 4 will be described hereinafter. The process of the flowchart starts in the step S85 of FIG. 19 independently of that of the cluster state monitoring process 221. The process of FIG. 21 can be a subroutine of the step S85.

In a step of S101, determination is made as to whether the own node is a master or a slave. If the own node is a master, the process proceeds to a step S102. If the own node is a slave, the process proceeds to a step S103.

In the step S102, a state verification request is made to the other nodes (taking-over nodes other than the own node).

Subsequently, in the step S103, the resource taking-over list and the address taking-over list are read from the each-state taking-over information of the shared storage system 6. From the read lists and the current state S, resources to be taken over and resources to be released are decided.

Then, in a step S104, the resources decided in the step S103 are released. Subsequently, in the step S104, the resources are taken over (file systems are mounted or the like), and the IP addresses are taken over to finish the process.

Thus, in the fail back process, as in the case of the fail over process, if the current state S is known, only by reading the resource taking-over list and the address taking-over list according to the state S, it is possible to decide the resources (processing) and the IP addresses to be taken over, and to carry out the fail back process at a very high speed.

Furthermore, since the fail back process is carried out in parallel at the taking-over nodes, a much higher-speed process can be realized.

<Details of State Verification Request Process 222>

Figure 22:
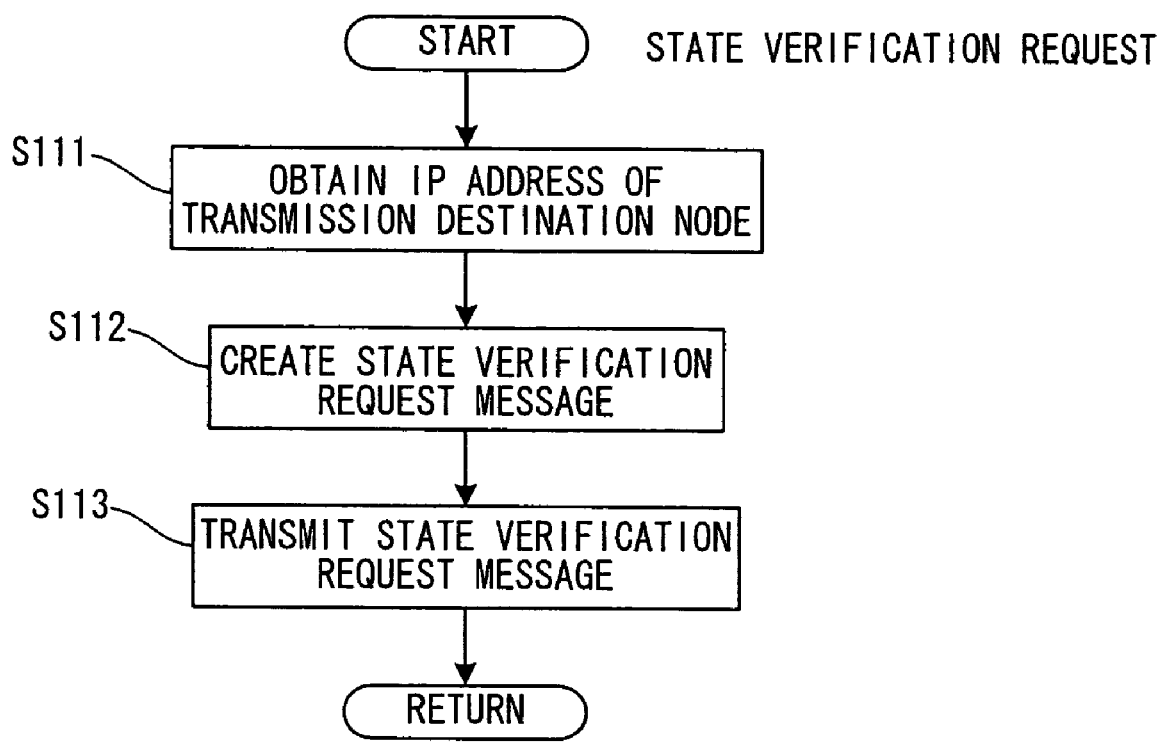
FIG. 22 is a flowchart of an example of a state verification request started in a step S93 of FIG. 20 and S102 of FIG. 21 according to the embodiment of this invention.

Referring to a flowchart of FIG. 22, specific processing contents of the state verification request process 222 executed by the fail over function 220 of each of the nodes 1 to 4 will be described hereinafter. The process of the flowchart starts in the step S93 of FIG. 20 or the step S102 of FIG. 21 independently of that of the cluster state monitoring process 221. The process of FIG. 22 can be a subroutine of the step S93 or the step S101.

In a step S111, the IP addresses of the destination nodes 1 to 4 are obtained from the set information 111 of the system management server 10. In a step S112, a message to be transmitted is created. In a step S113, the message is transmitted.

Thus, at the system management server 10 and the nodes 1 to 4 of the cluster 100, by sharing the verification table and the each-state taking-over information in the shared storage system 6, the fail over process or the fail back process can be carried out quickly. Since the each-state taking-over information is periodically updated by the system management server 10 before the fail over process or the fail back process is executed, it is possible to achieve a high processing speed by greatly reducing the arithmetic operation at the time of the fail over.

Furthermore, since for the each-state taking-over information, the system management server 10 decides the resources to be taken over according to the loads of the nodes 1 to 4, and executes verification, after the fail over process, it is possible to prevent the uneven loads among the nodes 1 to 4, and to efficiently use the resources of the cluster 100.

MODIFIED EXAMPLE 1

Figure 23:
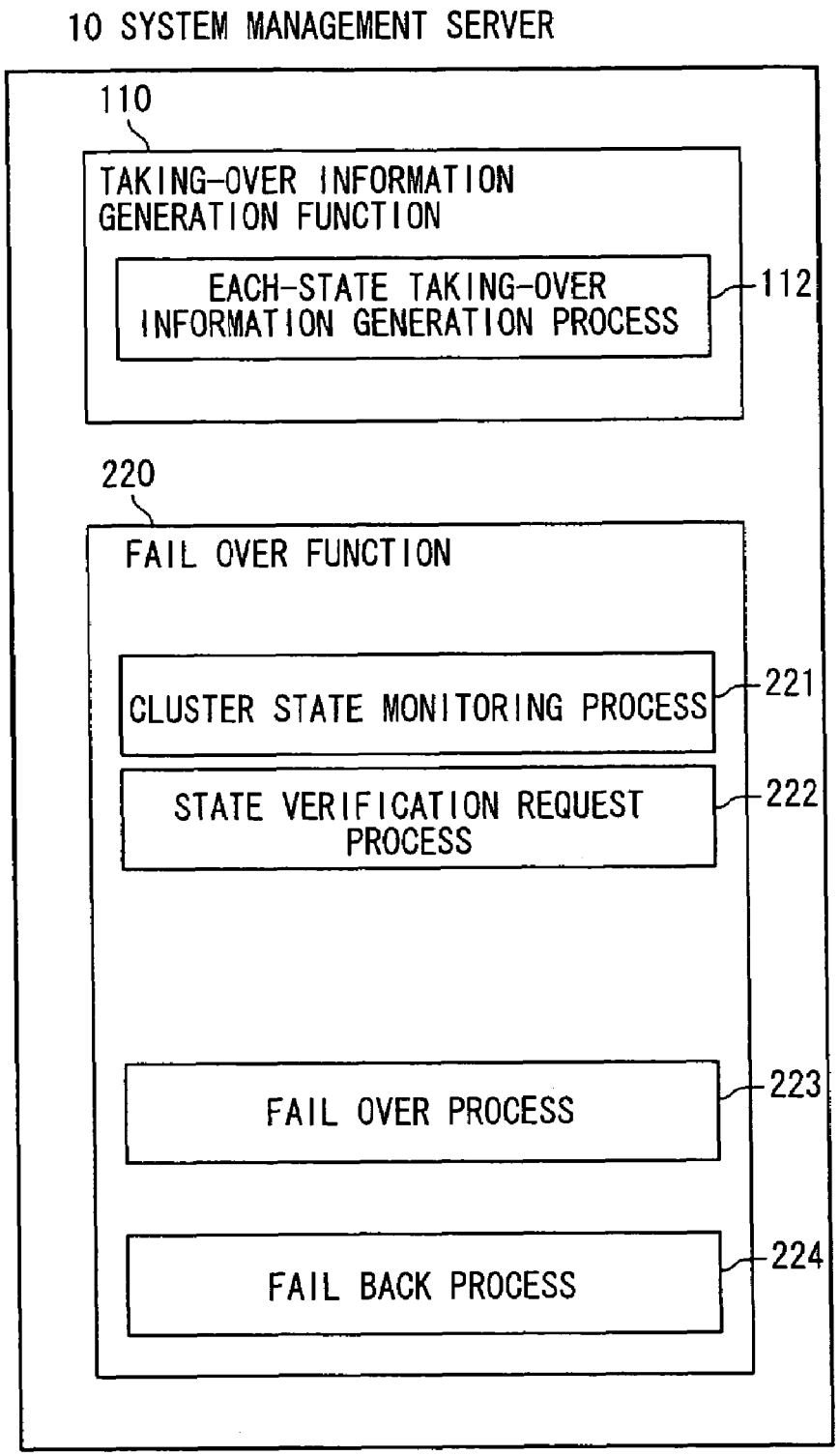
FIG. 23 is a block diagram of a first modified example showing a software configuration executed by a system management server according to the embodiment of this invention.

In the embodiment, the example in which one of the nodes 1 to 4 is a master and the fail over process is carried out has been described. As shown in FIG. 23, a configuration can be employed in which the fail over function 220 is mounted on the system management server 10, the system management server 10 always operates as a master, and the nodes 1 to 4 always operate as slaves. In this case, for example, by giving 0 as a node number to the system management server 10, a cluster node monitoring system by the system management server 10 can be established.

MODIFIED EXAMPLE 2

In the embodiment, the example in which one of the nodes 1 to 4 having a small taking-over node number is a master has been described. However, as shown in FIG. 24, a table indicating the number of times the node is set as a master may be set in the shared storage system 6, and the nodes may be set to be masters in order of small numbers of times of becoming masters. In this case, the nodes of small node numbers are prevented from repeatedly becoming masters, and it is possible to make the loads of the nodes 1 to 4 more uniform.

MODIFIED EXAMPLE 3

According to the embodiment, the state in which all the nodes 1 to 4 are operated is set as the 0th stage as shown in FIG. 8. However, the first stage (state in which one node is stopped) or the like may be set as an initial state. In this case, by placing the stopped node on standby, and adding the standby node to the cluster 100 (fail back) when the entire load of the cluster 100 increases, automatic node expansion can be realized.

It should be noted that the taking-over information generation function 110 may be executed by the standby node.

While the present invention has been described in detail and pictorially in the accompanying drawings, the present invention is not limited to such detail but covers various obvious modifications and equivalent arrangements, which fall within the purview of the appended claims.

What is claimed is:

1. A fail over method which is used for a system including a cluster comprised of a plurality of nodes and in which, when a trouble occurs in one of the plurality of nodes, a processing of the troubled node is taken over to another node, comprising the steps of:

causing the plurality of nodes to monitor operation states of one another;

detecting an occurrence of a trouble based on a result of the monitoring;

causing, when the occurrence of the trouble is detected, each node in the cluster, except for the troubled node, to read taking-over information prestored in a shared storage system for taking over processings of the troubled node to another node;

causing each node in the cluster, except for the troubled node, to take over the processing of the troubled node based on the taking-over information;

obtaining a load on each node in the cluster; and generating the taking-over information based on the obtained load when the trouble occurs in one of the plurality of nodes;

wherein the step of generating the taking-over information further comprises the steps of:

setting an upper limit of a number of taking-over times for each node processing; and selecting, by a management node which manages the plurality of nodes, a processing taken over to each node in the cluster, except for the troubled node, based on a current number of taking-over times and the upper limit of the number of taking-over times.

2. The fail over method according to claim 1, wherein the step of generating the taking-over information comprises the step of generating, regarding all trouble patterns of the nodes which possibly occur in the cluster, information taken over by the nodes in the cluster excluding the troubled node for each of the trouble patterns.

3. The fail over method according to claim 1, wherein the step of generating the taking-over information comprises the step of allocating the processings to be taken over to the nodes to prevent uneven loads thereon after the taking over based on a size of a load on the node which takes over a processing and a load of a processing taken over from the troubled node.

4. The fail over method according to claim 1, wherein:

the step of obtaining the load on the each node in the cluster comprises the step of causing a management node which manages the plurality of nodes to periodically obtain a load on each node;

the step of generating the taking-over information comprises the step of causing the management node to periodically generate taking-over information; and the management node periodically writes the taking-over information in the storage system shared by the plurality of nodes.

5. The fail over method according to claim 1, wherein the step of causing the plurality nodes to monitor the operation states of one another comprises the steps of:

causing each node to update a time stamp in the shared storage system at a predetermined cycle; and causing each node to read a time stamp of another node from the shared storage system, and to compare a difference between a present time and the time stamp with a predetermined trouble determination time.

6. The fail over method according to claim 1, wherein the step of generating the taking-over information comprises the step of generating address taking-over information in which an address of the troubled node is allocated to the taking-over node in a predetermined order.

7. The fail over method according to claim 3, wherein the step of generating the taking-over information further comprises the steps of:
sorting the processings to be taken over from the troubled node in order beginning with a largest load;
sorting the node that takes over the processing in order beginning with a smallest load; and
allocating the node which has sorted to the sorted processing.

8. A computing system which comprises a cluster constituted of a plurality of nodes and a system management node to manage the cluster, and in which, when a trouble occurs in one of the plurality of nodes, a processing of the troubled node is taken over to another node, comprising:
a shared storage system which is shared by the nodes in the cluster and the system management node and which stores taking-over information when a trouble occurs in one of the plurality of nodes,
wherein each node in the cluster comprises:
a monitoring unit which monitors an operation state of another node;
a detection unit which detects an occurrence of a trouble on the other node based on a result of the monitoring;
a taking-over information obtaining unit which obtains the taking-over information from the shared storage system when the trouble is detected;
a fail over unit which takes over processings of the troubled node based on the taking-over information when the trouble occurs;
a load obtaining unit which obtains a load on each node in the cluster; and
a taking-over information generation unit which generates the taking-over information based on the obtained load when the trouble occurs in one of the plurality of nodes, and writes the taking-over information in the shared storage system;
the taking-over information generation unit further comprises a taking-over number upper limit setting unit which sets an upper limit of a number of taking-over times for each node processing, and selects a processing taken over to each node in the cluster, except for the troubled node, based on a current number of taking-over times and the upper limit of the number of taking-over times.

9. The computing system according to claim 8, wherein:
the taking-over information generation unit presets all trouble patterns of the nodes which possibly occur in the cluster, and generates information taken over by the nodes in the cluster excluding the troubled node for each of the trouble patterns; and
the fail over unit decides processings to be taken over from the troubled node based on the taking-over information corresponding to the generated trouble pattern.

10. The computing system according to claim 8, wherein:
the taking-over information generation unit comprises:
a taking-over side load obtaining unit which obtains a load of a processing taking-over node; and
a taking-over source load obtaining unit which obtains a load of a processing taken over from the troubled node for each processing; and
the processings to be taken over are allocated to the nodes to prevent uneven loads on the nodes of taking-over sides.

11. The computing system according to claim 8, wherein:
the load obtaining unit periodically obtains the load on the each node; and
the taking-over information generation unit periodically generates taking-over information based on the load, and writes the taking-over information in the shared storage system.

12. The computing system according to claim 8, wherein:
the shared storage system comprises an area to store a time stamp of each node; and
the monitoring unit updates a time stamp in the area corresponding to an own node at a predetermined cycle, reads a time stamp of another node from the area, and compares a difference between a present time and the time stamp with a predetermined trouble determination time.

13. The computing system according to claim 8, wherein the taking-over information generation unit generates address taking-over information in which an address of the troubled node is allocated to the taking-over nodes in a predetermined order.

14. The computing system according to claim 10, wherein the taking-over information generation unit sorts the processings to be taken over from the troubled node in order beginning with a largest load, sorts the node in order beginning with a smallest load which takes over the processings and allocates the sorted processings to the sorted node.

* * * * *